US009703117B2

(12) United States Patent
Tipp et al.

(10) Patent No.: US 9,703,117 B2
(45) Date of Patent: Jul. 11, 2017

(54) EYEGLASS FRAMES WITH TEMPLE OVERLAY

(71) Applicant: Under Armour, Inc., Baltimore, MD (US)

(72) Inventors: Alan Scott Tipp, Elkhorn, NE (US); Jonathan Michael Martin, Covington, KY (US); Adam Harris Kaufer, Cutchogue, NY (US)

(73) Assignee: Under Armour, Inc., Baltimore, MD (US)

( * ) Notice: Subject to any disclaimer, the term of this patent is extended or adjusted under 35 U.S.C. 154(b) by 0 days.

(21) Appl. No.: 14/616,242

(22) Filed: Feb. 6, 2015

(65) Prior Publication Data
US 2016/0231590 A1  Aug. 11, 2016

(51) Int. Cl.
| G02C 5/14 | (2006.01) |
| G02C 5/00 | (2006.01) |
| G02C 5/16 | (2006.01) |
| G02C 11/02 | (2006.01) |

(52) U.S. Cl.
CPC .............. *G02C 5/14* (2013.01); *G02C 5/008* (2013.01); *G02C 5/146* (2013.01); *G02C 5/16* (2013.01); *G02C 11/02* (2013.01); *G02C 2200/08* (2013.01); *G02C 2200/16* (2013.01)

(58) Field of Classification Search
CPC . G02C 5/14; G02C 5/001; G02C 5/18; G02C 5/16; G02C 5/20; G02C 5/146
See application file for complete search history.

(56) References Cited

U.S. PATENT DOCUMENTS

| 4,564,272 | A | 1/1986 | Rinnooy Kan |
| 4,877,320 | A | 10/1989 | Holden |
| 5,652,637 | A | 7/1997 | Marini |
| 6,513,925 | B1 | 2/2003 | Bonacci |
| 7,490,935 | B1 * | 2/2009 | Vallee ................... G02C 5/00 351/121 |
| 7,553,014 | B2 | 6/2009 | Yang et al. |
| 7,559,644 | B1 | 7/2009 | Lloyd |
| 7,677,722 | B1 | 3/2010 | Mednick et al. |
| 8,317,318 | B2 | 11/2012 | Silver |

(Continued)

FOREIGN PATENT DOCUMENTS

TW    FR 2959024 A3 * 10/2011  ............. G02C 5/143

*Primary Examiner* — Darryl J Collins
*Assistant Examiner* — Journey Sumlar
(74) *Attorney, Agent, or Firm* — Maginot, Moore & Beck LLP

(57) ABSTRACT

Eyeglass frames include a face member with a rim configured to retain a lens. At least one temple frame member is connected to the face member. The temple frame member includes an upper perimeter portion and a lower perimeter portion with a slot formed between the upper and lower perimeter portions. A temple overlay is coupled the temple frame member. The temple overlay includes an upper lip and a lower lip. The upper lip is configured to wrap around the upper perimeter portion of the temple frame member and the lower lip is configured to wrap around the lower perimeter portion of the temple frame member. The temple overlay further includes a panel extending between the upper lip and the lower lip such that the panel is exposed in the slot of the temple frame member when the temple overlay is coupled to the temple frame member.

20 Claims, 11 Drawing Sheets

(56) References Cited

U.S. PATENT DOCUMENTS

| | | | |
|---|---|---|---|
| 8,752,957 B2 | 6/2014 | Ng | |
| 2014/0375946 A1* | 12/2014 | Rochford | G02C 5/006 351/63 |
| 2015/0116654 A1* | 4/2015 | Tang | G02C 5/143 351/116 |

* cited by examiner

EYEGLASS FRAMES WITH TEMPLE OVERLAY

FIELD

This document relates to the field of eyeglasses, and particularly temple members for eyeglass frames.

BACKGROUND

Eyeglasses have been used for hundreds of years to provide vision assistance to wearers. Eyeglasses typically comprise a face member including two eyewires or rims that hold lenses and a bridge that connects the two rims. The bridge may include a nosepiece to allow the rims to rest more comfortably on a wearer's nose. A temple member extends from the lateral side of each rim. The temple member is designed to extend rearwardly on the head of the wearer and over the ears in order to provide a resting position for the eyeglasses on the face of the wearer.

Eyeglasses provide vision assistance to the wearer in various ways. Prescription lenses provide corrective vision for the wearer, assisting the wearer in seeing near or distant objects more clearly. Eyeglasses may also provide protection for the eye of the wearer, including protection from wind or from flying debris. Eyeglasses with light blocking features are commonly referred to as sunglasses. Sunglasses may or may not include corrective lenses, but provide the benefit of blocking bright or excessive light from the eyes of a wearer.

Sunglasses may be particularly useful for a wearer participating in athletic events. In these situations, the glasses should provide vision benefits including protection from light, wind and other elements. In addition, sunglasses or other eyeglasses worn for athletic activity should be comfortable and fit properly on the head of the wearer. If the eyeglasses are not comfortable or do not fit properly, the eyeglasses may be distracting to the wearer.

Athletes wearing sunglasses or other eyeglasses during athletic events also face additional challenges with respect to the eyeglasses. In particular, perspiration from the head of the wearer may moisten the temple members. Because the materials used to form temple members tend to be non-absorbent polymer materials, moisture may accumulate on the temple member, resulting in a slick temple member that tends to slip relative to the ear of the wearer. Accordingly, it would be advantageous to provide eyeglasses with temple members that provide additional comfort and non-slip features for the wearer.

Another concern for athletes wearing eyeglasses is the look of the eyeglasses. Athletes often wear uniforms or an ensemble of coordinating athletic wear. These athletes may wish for their sunglasses or other eyeglasses to coordinate with their uniform or other athletic wear. Accordingly, it would be advantageous to provide sunglasses and other eyeglasses that are not only comfortable but also provide the wearer with the ability to customize the eyeglasses such that the eyeglasses serve as a fashion accessory or appear as a coordinating component of the uniform or athletic wear ensemble.

SUMMARY

In accordance with one exemplary embodiment of the disclosure, there is provided eyeglass frames comprising a face member including a rim configured to retain a lens, and at least one temple frame member connected to the face member. The temple frame member includes an upper perimeter portion and a lower perimeter portion with a slot formed between the upper perimeter portion and the lower perimeter portion. A temple overlay is releasably coupled to the temple frame member. The temple overlay comprises an upper lip and a lower lip. The upper lip is configured to wrap around the upper perimeter portion of the temple frame member and the lower lip is configured to wrap around the lower perimeter portion of the temple frame member. The temple overlay further comprises a panel extending between the upper lip and the lower lip such that the panel is exposed in the slot of the temple frame member when the temple overlay is coupled to the temple frame member. The upper lip and the lower lip are sufficiently resilient such that the temple overlay may be repeatedly removed and repositioned on the temple frame member.

Pursuant to another exemplary embodiment of the disclosure, there is provided a temple arrangement for eyeglasses. The temple arrangement comprises a temple spine including an upper column, a lower column, and a slot provided between the upper column and the lower column. The temple arrangement further comprises a temple overlay releasably positioned on the temple spine. The temple overlay includes an upper perimeter member configured to engage the upper column of the spine and a lower perimeter member configured to engage the lower column of the spine. The temple overlay further comprises a panel extending between the upper perimeter member and the lower perimeter member. The temple spine is comprised of a first material, the upper perimeter member and the lower perimeter member are comprised of a second material, and the panel is comprised of a third material. The first material has a greater hardness than the second material, and the second material has a greater hardness than the third material.

According to another exemplary embodiment of the disclosure, eyeglass frames comprise a face member including a rim configured to retain a lens. At least one temple member is connected to the face member. The temple member includes an upper perimeter portion and a lower perimeter portion with a slot formed between the upper perimeter portion and the lower perimeter portion. A textile panel extends between the upper perimeter portion and the lower perimeter portion of the temple frame member such that the panel is exposed in the slot of the temple frame member.

According to yet another exemplary embodiment of the disclosure, a method for customizing eyeglasses comprises positioning a first temple overlay on a spine of a temple member. The first temple overlay includes a first upper perimeter member configured to engage the upper column of the spine and a first lower perimeter member configured to engage the lower column of the spine. The first temple overlay also includes a first panel extending between the upper perimeter member and the lower perimeter member. The method further comprises releasing the first temple overlay from the spine of the temple member. In addition, the method comprises positioning a second temple overlay on the spine of the temple member. The second temple overlay comprises a second upper perimeter member configured to engage the upper column of the spine and a second lower perimeter member configured to engage the lower column of the spine. The second temple overlay further comprises a second panel extending between the upper perimeter member and the lower perimeter member, the second panel different than the first panel.

The above described features and advantages, as well as others, will become more readily apparent to those of ordinary skill in the art by reference to the following detailed description and accompanying drawings. While it would be desirable to provide an eyeglass frame that provides one or more of these or other advantageous features, the teachings disclosed herein extend to those embodiments which fall within the scope of the appended claims, regardless of whether they accomplish one or more of the above-mentioned advantages.

DESCRIPTION

Figure 1:
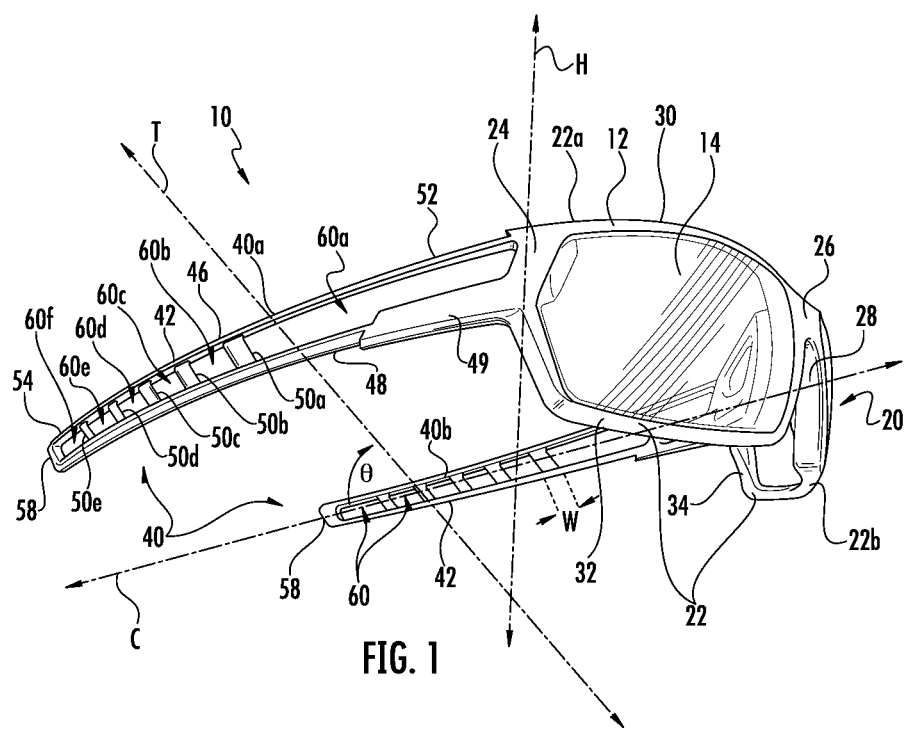
FIG. 1 is a right side perspective view of eyeglasses with a frame including a temple spine.

With reference to FIG. 1, in at least one embodiment, a set of eyeglasses 10 includes an eyeglass frame 12 with a pair of lenses 14 supported by the frame 12. The frame 12 includes a face member 20 and a pair of temple members 40 connected to the face member 20. The face member 20 is configured to extend across the face of a wearer and retain the lenses 14 in position over the eyes of a wearer of the eyeglasses 10. The temple members 40 are configured to extend rearwardly from the face member 20 and rest on the ears of the wearer. Accordingly, the frame 12 is supported by the head of the wearer with the face member 20 engaging the nose of the wearer and the temple members 40 engaging the ears of the wearer.

The lenses 14 of the eyeglasses 10 may be provided as any of various lens types as will be recognized by those of ordinary skill in the art. Examples of different types of lenses include prescription and non-prescription lenses, darkened lenses, or lenses with any of various additional features such as shatter-proof lenses, glare-resistant lenses, polarized lenses, or any of various other types of lenses. If the lenses 14 are darkened or include light blocking features, the eyeglasses may be considered "sunglasses". In some embodiments, the lenses 14 may be transitional lenses that change from transparent to translucent/darkened when exposed to ultra-violet radiation. Although two lenses 14 are shown in the embodiment of FIG. 1, the eyeglass 10 may alternatively be configured to retain a unitary lens provided by a single piece of plastic or glass which covers both eyes of the wearer.

Figure 2:
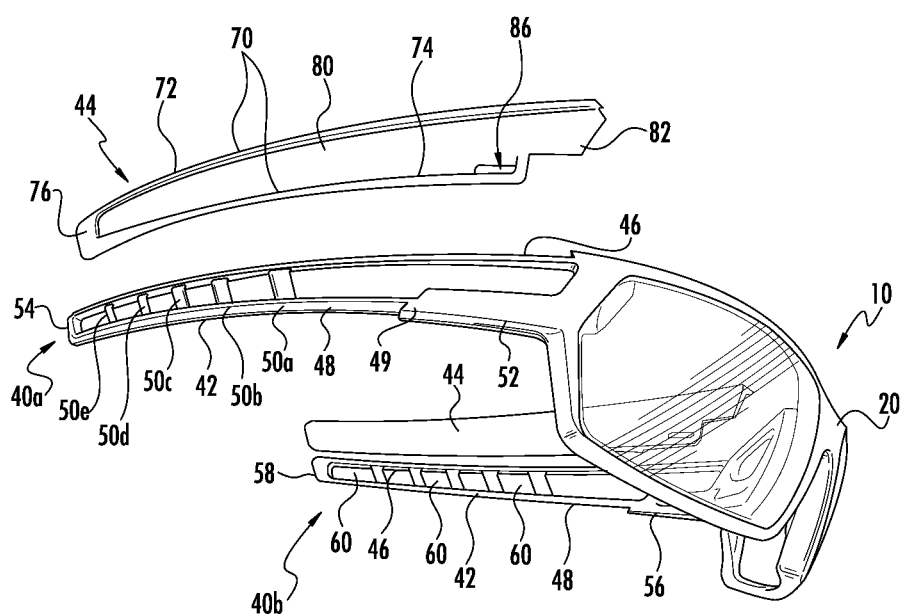
FIG. 2 is a right side perspective view of the eyeglasses of FIG. 1 including a temple overlay shown in juxtaposition with the temple spine.

The face member 20 includes a pair of rims 22, rim extension member 24 and a bridge 26. The rims 22 include a right rim 22a and a left rim 22b. As used herein, the singular term "rim 22" refers to either the right rim 22a or the left rim 22b, and the plural term "rims 22" refers to both the right rim 22a and the left rim 22b. The rims 22 are configured to retain the lenses 14. In the embodiment of FIGS. 1 and 2, each rim 22 is full rim that completely encircles the lens 14 retained by the rim 22. However, it will be recognized that, in alternative embodiments, the rims 22 may be partial rims that do not completely encircle the lenses.

With continued reference to FIG. 1, each rim 22 includes an upper brow 30 including a front surface 32, a rear surface 34, and a central groove (not shown) formed between the front surface 32 and the rear surface 34. The lens 14 is positioned in the central groove. The lens 14 is retained in the central groove using any of various fastening means, such as an adhesive or a screw or other fastener that extends through the rear surface 34 and lens 14 and into the rim 22, or some combination thereof.

The bridge 26 of the face member 20 is provided at a medial side of each rim 22. The bridge 26 includes a lower surface 28 that is contoured in an arch-like shape to curve around the nose of the wearer. The bridge 26 joins the right side rim 22a to the left side rim 22b. In the embodiment of FIGS. 1 and 2, the bridge 26 is provided as a unitary component with the rims 22. The unitary component may be molded or otherwise formed from any of various materials as will be recognized by those of ordinary skill in the art. For example, the rims 22 and the bridge 26 of the face member may be comprised of a thermoplastic polyamide based on aliphatic and cycloaliphatic blocks. In other exemplary embodiments, the rims 22 and the bridge 26 of the face member may be comprised of other materials, such as thermoplastic polyurethane or other polymer materials. A nose pad (not shown) may be coupled to the bridge 26 to rest on the nose of the wearer. The nose pad may be comprised of a resilient material having a lesser hardness than the rims 22 and bridge 26 such that the nose pad is comfortable against the skin of the wearer and helps secure the frame 12 in place on the face of the wearer.

The lateral side of each rim 22 is connected to a rim extension member 24. The rim extension member 24 is generally an enlarged portion of the frame 12 that is provided on the lateral sides of the face member 20 between the lenses 14 and the temple members 40. In at least some embodiments, a hinge 38 (see FIG. 3) is provided at the rim extension member 24. The hinge 38 allows the associated temple member 40 to pivot about a pivot axis H defined by the hinge. It will be recognized that in certain other embodiments, the frame 12 may be configured without a hinge between the face member 20 and the temple members 40.

Two temple members 40 are connected to the face member 20. As used herein, the singular term "temple member 40" refers to either the right temple member 40a or the left temple member 40b, and the plural term "temple members 40" refers to both the right temple member 40a and the left temple member 40b. Each temple member 40 extends rearwardly from the face member 20 to a position configured to rest behind the ear of the wearer. Each temple member 40 is generally elongated in form and may include an end portion that curves either downward or inward, or both downward and inward.

Each temple member 40 includes a temple frame member in the form of an elongated temple spine 42 and a releasable temple overlay 44. The temple spine 42 (also referred to herein as simply "spine") provides structural support for the temple arrangement and is configured to retain the releasable temple overlay 44. The spine 42 is comprised of a first material and the overlay 44 is comprised of a second material, the first material of the spine 42 being harder and more rigid than the second material of the overlay 44. As shown in FIG. 2, the overlay 44 is releasable from the spine 42 of the temple member 40 such that the overlay 44 may be repeatedly removed and then repositioned on the temple spine 42.

Figure 3:
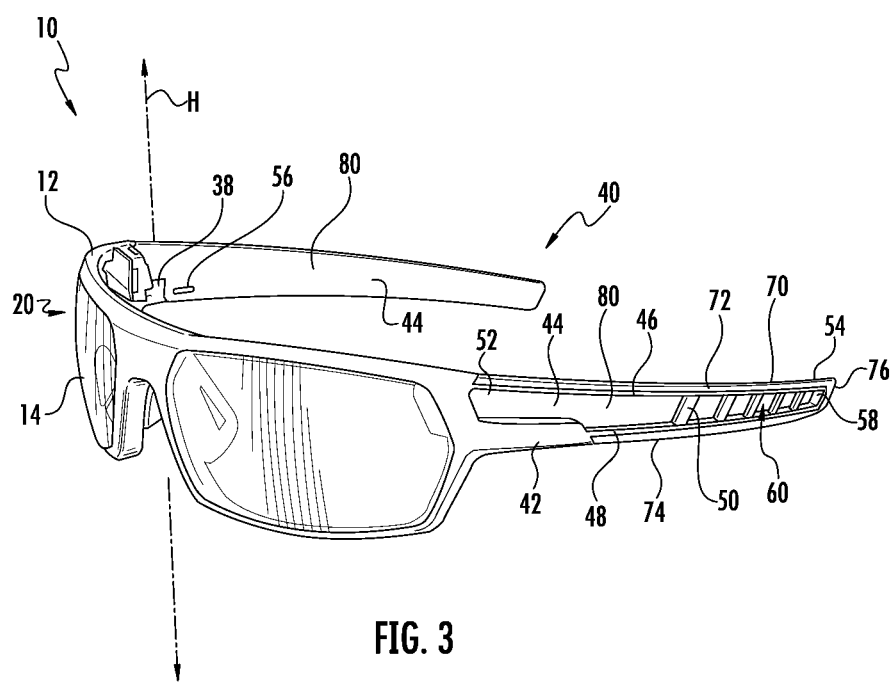
FIG. 3 is a left side perspective view of the eyeglasses of FIG. 2 with the temple overlay releasably positioned on the temple spine.

With reference again to FIG. 1, the spine 42 includes an upper column 46 and a lower column 48 with a plurality of transverse ribs 50 extending between the upper column 46 and the lower column 48. The columns 46 and 48 extend from a face-end 52 to an ear-end 54 of the spine 42. The columns 46 and 48 are generally rod-like but do not necessarily extend along a straight axis and may instead curve somewhat relative to the axes defined by the columns 46 and 48. For example, the ear-end 54 of each column 46 or 48 may curve slightly downward and inwardly from an axis defined along the face-end 52 of the column 46. The lower column 48 includes a lower block 49 that provides a thicker portion of the column near the face-end 52 of the spine 42. This lower block 49 thus has a greater girth than the portion of the lower column 48 near the ear-end of the spine 42. The lower block 49 is connected to the rim extension member 24 and may be provided as the temple side of the hinge 38. As best shown in FIG. 3, a pill-shaped tab 56 is provided on the medial side of the lower block 49. The tab 56 protrudes inwardly from the remainder of the medial surface of the lower block 49

The perimeter of the spine 42 is formed by the upper column 46 which provides the upper perimeter portion of the spine 42, the rim extension member 24 at the face-end 52 of the spine 42, the lower column 48 which provides the lower perimeter portion of the spine 42, and a tip connection 58 on the ear-end 54 of the spine 42. A plurality of slots 60 are formed within the perimeter of the spine 42. In particular, the slots 60 are formed between the upper column 46 and the lower column 48 and between the transverse ribs 50.

The transverse ribs 50 are provided between the face-end 52 and the ear-end 54 of the spine 42 and extend from the lower column 48 to the upper column 46. As used herein, the singular term "transverse rib 50" refers to any one of transverse ribs 50a, 50b, 50c, 50d, or 50e and the plural term "transverse ribs 50" refers to all of transverse ribs 50a-50d. Each transverse rib 50 extends inwardly from the column 46 on a medial side of the spine 42. The first transverse rib 50a is spaced apart from the lower block 49 provided on the lower side of the spine 42. Four successive transverse ribs 50b, 50c, 50d and 50e follow the first transverse rib 50a moving toward the ear-end 54 of the temple member 40. Each successive transverse rib 50 is narrower than the previous rib. The slots 60 are defined between each of the transverse ribs 50 and between the first transverse rib 50a and the face-end 52 of the temple member. As used herein, the singular term "slot 60" refers to any one of slots 60a, 60b, 60c, 60d, 60e, or 60f and the plural term "slots 60" refers to all of slots 60a-60f.

As shown in FIG. 1, the transverse ribs 50 extend from the upper column 46 to the lower column 48. The direction in which the transverse ribs 50 are oriented generally defines an axis T that is transverse to the axis C defined by the column 46 of the spine 42. The axis T is also transverse to the axis H that is substantially perpendicular to the axis C. Accordingly, the transverse ribs 50 define an angle θ relative to an axis defined by the column of the spine (i.e., the angle θ is defined by the axis C and a ray of axis T extending upward from the axis C and directed away from the face member 20 of the eyeglass frame 12). In the embodiment shown in FIG. 1, the transverse ribs 50 all define the same angle θ. In at least one embodiment, the transverse ribs 50 are all angled between thirty and eighty degrees from the axis C (i.e., $40°<θ<80°$). In at least one embodiment, the transverse ribs 50 are angled between fifty-five and seventy-five degrees from the axis C (i.e., $50°<θ<70°$), and are particularly angled about 60° from the axis C (i.e., $θ=60°$).

In at least one embodiment, the transverse ribs 50 are slightly opened toward the face-end of the spine 42. In other words, the forward edge of each transverse rib 50 may be positioned closer to the lateral side of the spine 42 and the rearward edge of each transverse rib 50 may be positioned closer to the medial side of the spine 42. As a result, air will tend to be directed inward toward the head of the wearer when the wearer moves in a forward direction.

With continued reference to FIG. 1, the transverse ribs 50 are successively narrower moving from the face-end 52 to the ear-end 54 of the temple member 40. In the embodiment of FIG. 2, each transverse rib 50 has a width w (only the width w of the transverse rib 50a nearest the ear-end is shown in FIG. 1). In at least one embodiment, the width w of the first rib 50a is between 3 mm and 10 mm, and the width w of the most distal rib 50e is between 0.5 mm and 3 mm. In one particular embodiment, the width w of the first rib 50a is about 5 mm, the width of the second rib 50b is 4 mm, the width of the third rib 50c is 3 mm, the width of the fourth rib 50d is 2 mm, and the width of the fifth rib 50e is about 1 mm.

The plurality of slots 60 are formed in the spine 42 and provide openings in the spine 42 between the upper column 46 and the lower column 48 and between the transverse ribs 50. The slots 60 are sufficiently sized to allow a third party to see through the slots 60 when the eyeglasses 10 are worn by the wearer. In at least one embodiment, the slots 60 are between 2 mm and 10 mm in height (defined by axis H) and between 2 mm and 10 mm in width, with the exception of the first slot 60a, which is between 2 cm and 8 cm in width. The slots 60b-60f are successively wider moving from the face-end 52 to the ear-end 54 of the temple member 40 (i.e., the distance between each rib 50 is successively greater moving from the face-end 52 to the ear-end 54 of the temple member 40). This arrangement wherein the ribs 50 are successively narrower and the slots 60 are successively wider results in a temple member 40 that becomes increasingly flexible when approaching the ear-end 54 of the spine. As a result of this flexibility, the temple arrangement provides less pressure on the occipital bones but still provides a secure fit for the sunglasses on the head of the wearer.

The spine 42, including the upper column 46, lower column 48, and transverse ribs 50 is provided a unitary component formed from a first material having a greater hardness (e.g., a greater durometer) than the overlay 44. In at least one embodiment, the spine 42 is comprised of a thermoplastic polyamide based on aliphatic and cycloaliphatic blocks and does not contain a plasticizer. The thermoplastic polyamide material may exhibit good heat resistance, excellent fatigue behavior, low moisture absorption and dimensional stability. One exemplary material that may be used as the first material is GRILAMID® TR 90. Other materials may also be used as the first material. In at least one embodiment, the first material is a nylon based polymer material.

With reference now to FIGS. 2-3, the temple overlay 44 (which may also be referred to herein as the "overlay") has a perimeter shape that is similar to the perimeter shape of the spine 42. The overlay 44 provides an inner barrier between the wearer and the spine 42. The barrier covers most portions of the medial side (i.e., the wearer-side) of the spine 42, but leaves the lateral side of the spine 42 exposed. In the embodiment of FIGS. 2-3, the overlay 44 substantially covers the medial side of the spine 42 between the face-end 52 and the ear-end 54 of the spine 42.

The overlay 44 includes perimeter members provided by lips 70 formed around the perimeter of the overlay 44 and a central member provided by a panel 80 extending between the lips 70. The lips 70 include an upper lip 72, a lower lip 74, and an end lip 76. The lips 70 define most of the perimeter of the overlay 44 with the exception of an open perimeter portion 82 at the face-end of the overlay 44. The panel 80 defines the perimeter of the overlay at this open perimeter portion 82.

The upper lip 72 is configured to wrap around the upper column 46 of the spine 42 from the face-end 52 to the ear-end 54, leaving only a small portion of the upper column 46 of the spine 42 exposed. For example, as shown in FIG. 3, when the overlay 44 is positioned on the spine 42, the upper lip 72 covers all of the upper side and most of the lateral side of the upper column 46. The lower side of the upper column 46 remains exposed along with a thin strip of the lower lateral side of the upper column 46.

Similar to the upper lip 72, the lower lip 74 is configured to wrap around the lower column 48 of the spine 42 from a position on the face-end 52 past the lower block 49 to the ear-end 54 of the lower column 48. When the lower lip 74 wraps around the lower column, only a small portion of the lower column 48 of the spine 42 is left exposed on the lateral side of the temple member 40. For example, as shown in FIG. 3, when the overlay 44 is positioned on the spine 42, the lower lip 74 covers all of the lower side and most of the lateral side of the lower column 48. The upper side of the lower column 48 remains exposed along with a thin strip on the upper lateral side of the lower column 48.

In like manner, the end lip 76 is configured to wrap around the tip connection 58 on the ear-end 54 of the spine 42, leaving only a small portion of the tip connection 58 exposed. For example, as shown in FIG. 3, when the overlay 44 is positioned on the spine 42, the end lip 76 covers all of the rear side and most of the lateral side of the tip connection 58, but leaves the forward side of the tip connection 58 exposed.

The lips of the overlay 44 are comprised of a second material having a lesser hardness (e.g. a lesser durometer) than the first material that forms the spine 42. In at least one embodiment, the overlay 44 is comprised of a thermoplastic elastomer (TPE) material such as a thermoplastic polyurethane (TPU). In other embodiments, the overlay 44 may be comprised of natural or synthetic rubber materials or any of various other polymer materials. The overlay 44 generally exhibits less stiffness and a softer, more resilient feel to the wearer than the spine 42. The material used to form the lips 70 of the overlay 44 is of sufficient stiffness to securely wrap around the spine 42 and secure the overlay 44 in place on the spine 42. At the same time, the material used to form the lips 70 of the overlay 44 is sufficiently resilient to allow the lips 70 to be repeatedly wrapped around and repeatedly released from the columns 46 and 48 of the spine 42.

The panel 80 extends from the upper lip 72 to the lower lip 74 of the overlay and from the face-end to the ear-end of the overlay 44. The panel 80 generally includes a relatively flat and smooth surface on both the medial and lateral sides of the panel 80. A small slot 86 provides an opening in the panel 80 at the face-end of the panel. The slot 86 is configured to receive the tab 56 on the medial side of the spine 42, and assist in retaining the panel 80 in position on the spine 42. In particular, the slot 86 and tab 56 arrangement may be useful in locking the overlay 44 on the spine 42 and preventing the overlay 44 from sliding off of the spine 42 when the user removes the sunglasses from his or her head.

In the embodiment of FIGS. 1-3, the panel 80 is integrally formed with the lips 70 and is comprised of the same material such that the overlay 44 is a single piece of uniform composition. However, it will be recognized that in other embodiments, such as that described below with reference to FIG. 4, the panel 80 may be comprised of a different material than the lips 70 of the overlay 44.

With specific reference now to FIG. 3, when the overlay 44 is positioned on the spine 42, the panel 80 substantially covers the entire medial side of the spine 42. The tab 56 is inserted into the slot 86 and is therefore the only portion exposed on the medial side of the spine 42. The lips 70 of the overlay wrap around most of the spine 42, including the upper column 46, lower column 48 and the tip connection 58. The open perimeter portion 82 of the overlay 44 covers the spine to the hinge 38 at the upper column 46 and the lower column 48. The surface of the lower lip 72 is flush with the lower block 49 on the lateral side of the spine 42, and the surface of the perimeter portion 82 extends over the lower block 49 on the medial side of the spine 42. The shape of the perimeter portion 82 is such that the perimeter portion 82 is in alignment with the perimeter of the spine 42 at the face-end 52 of the spine 42. In at least one embodiment, the perimeter portion 82 of the overlay may extend slightly past the hinge and engage the rims 22 on the face end of the frame 12.

Because the overlay 44 covers the ear-end of the lower column 48 of the spine 42, the overlay 44 is configured to engage the ear of the wearer of the eyeglasses 10. As noted previously, because the overlay 44 is comprised of a relatively soft and resilient material, the overlay 44 provides a comfortable surface against the ear of the wearer. At the same time, the relatively soft and resilient surface of the overlay may provide a surface with an increased coefficient of friction that is also relatively tacky and resistant to slippage in high moisture conditions, such as when the wearer is perspiring.

With reference now to FIGS. 46, in at least one embodiment, the lips 70 of the overlay 44 are comprised of the second material, as described above, and the panel 80 is comprised of a third material that is different than the second material. In particular, the lips 70 of the overlay may be comprised of the same material as described previously, such as a TPU or other TPE material. The panel 80 of the overlay 44 may be comprised of a textile. For example, the panel 80 may be comprised of a fabric comprising polyester fibers, cotton fibers, elastane fibers, other fibers, or some combination thereof. For example, the textile may be a compression fabric similar to that sold by Under Armour, Inc. in various garments under the HEATGEAR® and COLDGEAR® marks. Accordingly, the fabric may provide moisture wicking, heat retention, or any of various other qualities that may add to the comfort of the wearer depending on the activity of the wearer and the associated environmental conditions. In yet additional embodiments, the panel may be comprised of different materials such as mesh, foam, polymer, or other materials. In such embodiments, the second material of the lips may have a greater hardness than that of the panel. For example if the lips comprised of TPU will generally have a greater hardness than a panel comprised of an elastane fabric.

Figure 4:
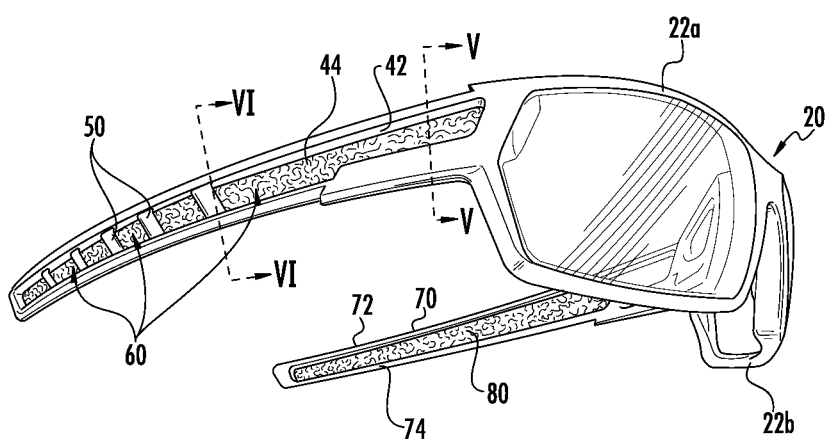
FIG. 4 is a right side perspective view of an alternative embodiment of the eyeglasses with a temple overlay of FIG. 3, the temple overlay including a fabric panel extending between upper and lower lips of the temple overlay.
Figure 5:
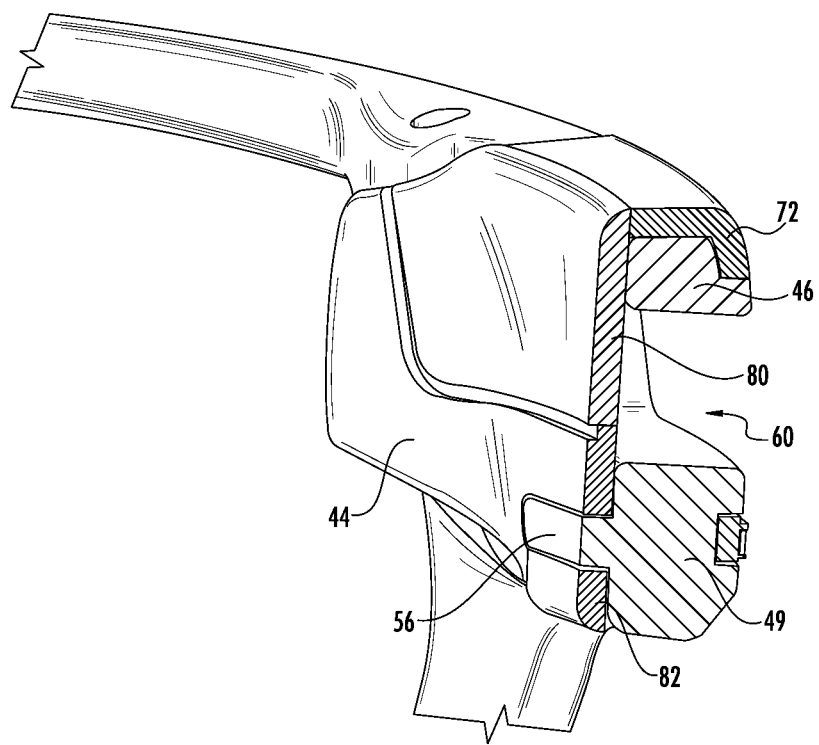
FIG. 5 is a cross-sectional view of the eyeglasses along line V-V of FIG. 4.
Figure 6:
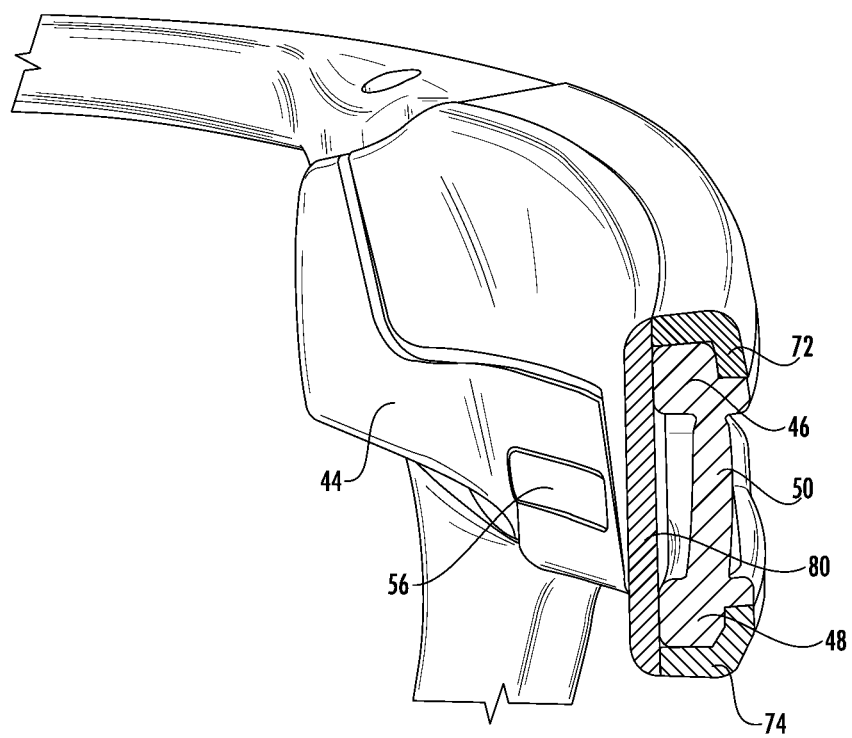
FIG. 6 is a cross-sectional view of the eyeglasses along line VI-VI of FIG. 4.
Figure 7:
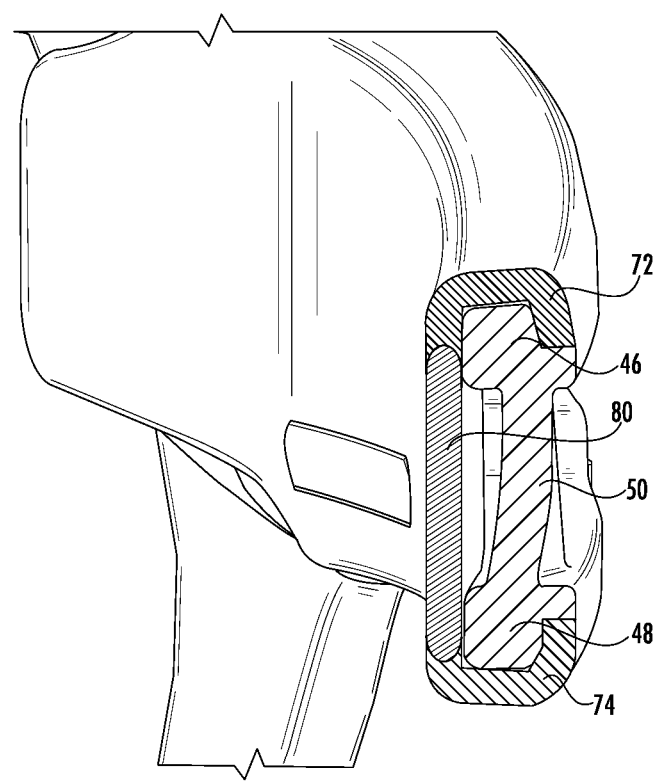
FIG. 7 is a cross-sectional view of an alternative embodiment of the temple overlay along line VI-VI of FIG. 4.
Figure 8:
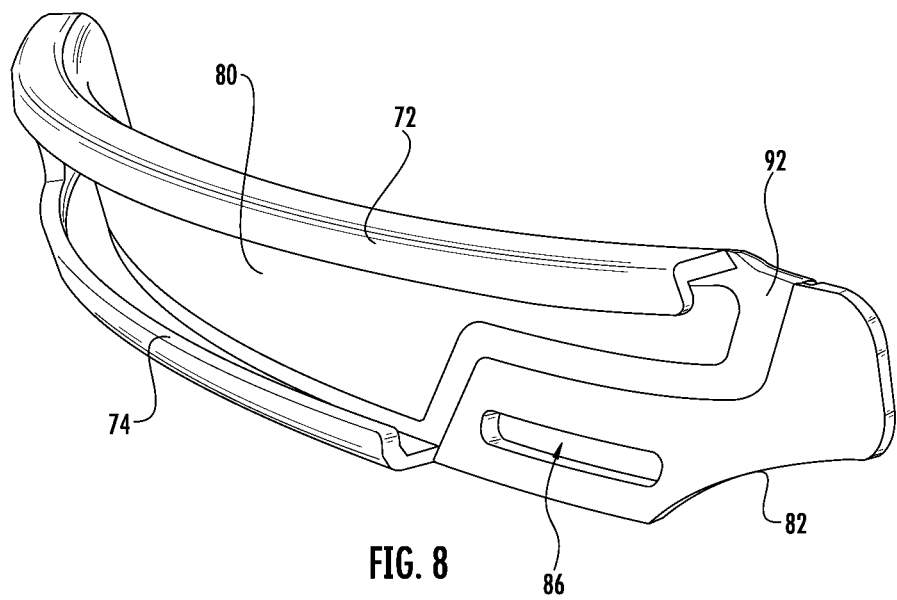
FIG. 8 is a lateral perspective view of an alternative embodiment of the temple overlay of FIG. 4.

In the embodiment of FIGS. 4-6 wherein the panel 80 is comprised of a fabric or other material that is different from the lips 70, the overlay is still formed as a unitary component. For example, the lips 70 of the overlay 44 may be overmolded onto the panel 80 with the perimeter of the panel fused onto the perimeter of the lips 70, as shown in FIGS. 5 and 6. In this embodiment, the perimeter of the panel 80 is in abutment with the perimeter of the lips 70. In an alternative embodiment, as shown in FIG. 7, the perimeter of the lips 70 are sandwiched around the perimeter of the panel 80, or the lips 70 otherwise overlap with the panel 80. In yet another alternative embodiment, as shown in FIG. 8, the panel 80 is a fabric panel that is fused to an inner ring 92 positioned between the lips 70 and the panel 80. The lips 70 are comprised of TPU and both the lips 70 and the panel 80 are molded to the inner ring 92 using a dual molding process. In each of the embodiments of FIGS. 4-8, the panel 80 may comprise at least some polyester fibers that allow the panel to better fuse and bond to TPU lips. Accordingly, in such embodiments, the overlay 44 is provided as a unitary component wherein the panel 80 is not removable from the lips 70 without destruction of the panel 80 or the lips 70. In such embodiments, a seam will exist between the lips 70 and the panel 80, but the seam may be relatively narrow and thin such that it is not easily perceptible to the wearer both visually and tactilely.

With particular reference to the embodiment of FIGS. 4-6, when the overlay 44 is positioned on the spine 42, the overlay 44 completely covers the medial side of the spine 42. When the lips 72 and 74 are properly positioned over the columns 46 and 48, the panel 80 is pulled taut between the upper lip 72 and the lower lip 74. The panel 80 is visible from the lateral side of the temple member through the slots 60. In at least one embodiment, the panel 80 may be of a particular color or design that coordinates with other athletic gear worn by an athlete. For example, the color of the panel 80 may match or coordinate with the color of a hat or shirt worn by the athlete (e.g., blue, red, green, yellow, etc.). Furthermore, the lips 70 may have a similar matching or coordinating color.

Figure 10:
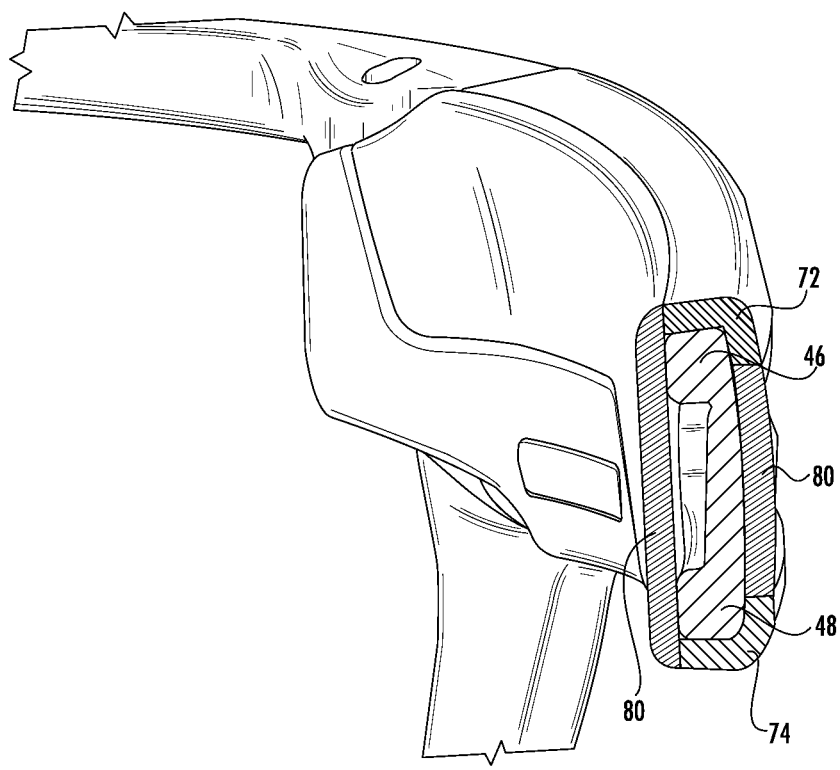
FIG. 10 is an alternative embodiment of the temple overlay shown along the same cross-sectional view as FIG. 6.
Figure 11:
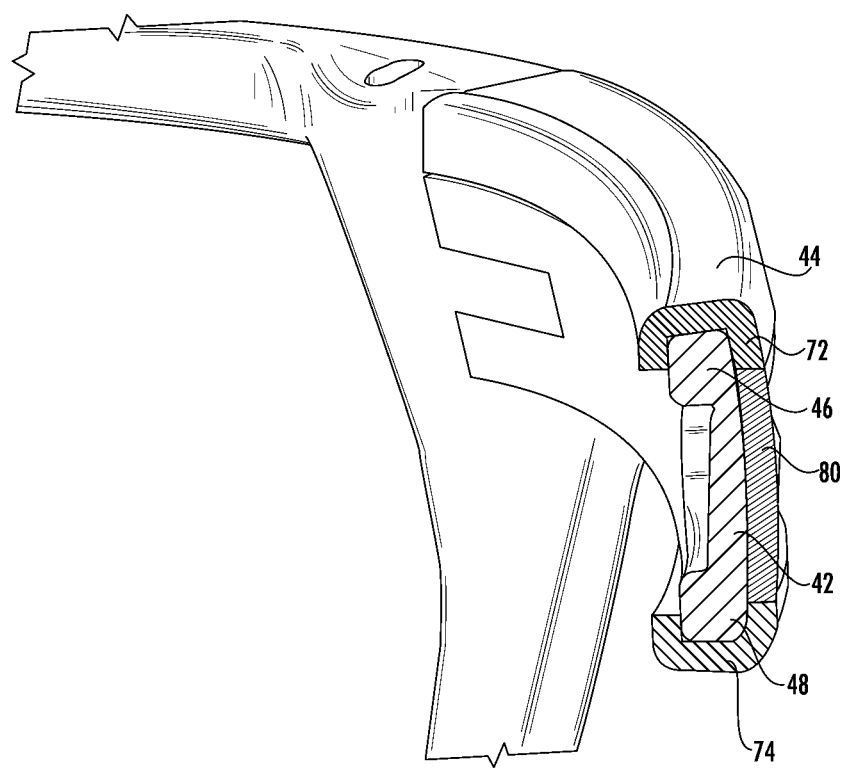
FIG. 11 is yet another alternative embodiment of the temple overlay shown along the same cross-sectional view as FIG. 6.

In at least one alternative embodiment, the overlay 44 may be configured to cover the lateral side of the spine 42 in lieu of or in addition to the medial side of the spine 42. For example, FIG. 10 shows an alternative embodiment wherein the overlay 44 is a sleeve member that slides over the spine 44 and substantially covers the medial, lateral, upper and lower sides of the spine. As another example, FIG. 11 shows an alternative embodiment wherein the overlay covers the lateral, upper and lower sides of the spine 42, but does not substantially cover the medial side of the spine 42. Instead, the slots and ribs of the spine are exposed on the medial side of the spine 42 in the embodiment of FIG. 11. In each of the embodiments of FIGS. 10 and 11, each panel 80 may be comprised of a fabric material, another different material from the lips 70, or the same material as the lips 70. Alternatively, in the embodiment of FIG. 10, the medial panel may be comprised of one material that is different from the lips (e.g., a textile) and the lateral panel may be comprised of the same material as the lips (e.g., a TPU material). Accordingly, it will be recognized that numerous variations of the overlay 44 arrangement on the spine 42 are possible.

In at least one alternative embodiment which combines features from the embodiment of FIGS. 1-3 and 4-6, the lips 70 and the panel 80 are both comprised of the same material, such as TPU or another resilient material to facilitate grip on the temple members 40, but the panel 80 has a different look than that of the lips 70. For example, the lips 70 could be provided in a first color (e.g., blue), and the panel 80 could be provided in a second color (e.g., yellow). As another example, the panel 80 could provide advertising or decorative features not found on the lips 70. In this embodiment, where the lips 70 and the panel 80 include different features, but comprise the same material, the panel may be joined to the lips using any of various methods, such as co-molding, fusion, etc.

In at least one embodiment, the overlays 44 are sold as an accessory to the eyeglasses 10, allowing the wearer to select an appropriate overlay 44 from a choice of several different overlays based on a particular athletic event, desired functionality, or fashion preference. For example, if the wearer intends to use the eyeglasses 10 during an event where he or she is likely to perspire, the wearer may select an overlay 44 that provides moisture-wicking capabilities, thus assisting in cooling the wearer. Alternatively, if the wearer intends to use the eyeglasses 10 during an outdoor event that will be cold, such as a wintertime run, the wearer may select an overlay 44 that provides heat insulating features. Moreover, additional features of the overlay 44 may be chosen based on a fashion preference or affiliations of the wearer. These additional features may be represented by panels of different colors or artistic designs, panels with logos, panels that promote different sports teams (e.g., "Eagles"), panels that include geographic indicia (e.g., "Maryland" or "USA"), or panels with other aesthetic or functional designs (e.g., flowers, camouflage, etc.). The wearer may choose one overlay to wear at one time and a different overlay for a later time, depending on the functionality or fashion statement desired. Alternatively, the wearer may even choose to wear two different overlays at the same time (e.g., a red overlay on the right temple member and a blue overlay on the left temple member).

In the embodiments disclosed herein, the left and right temple overlays 44 for the eyeglasses 10 are disclosed as being two separate components. However, in at least one alternative embodiment, the left and right overlays 44 could be constructed as a unitary component that includes a connection member between the two overlays. For example, the overlays could include a member that is designed to extend across the brow portion of the frame on the face member 20 when the overlays 44 are coupled to the temple members 40. This would be advantageous because the two different temple overlays 44 would be inseparable, and therefore, the left overlay could not be lost separate from the right overlay.

In addition to the above, because the overlay 44 is releasable on the temple, the wearer may also choose to use the eyeglasses 10 without the overlay 44 positioned on the spine 42. When the eyeglasses 10 are worn without the overlay 44, the angled ribs 50 will tend to vent additional air inward toward the wearer since the panel 80 is not in position to block the air. On the other hand, when the eyeglasses 10 are worn with the overlay 44, the overlay is provided on the medial side of the temple member 40, thus providing softer components against the head of the wearer (i.e., the lips 70 and panel 80 are both comprised of materials that are softer than the spine 42), making the eyeglasses more comfortable. As described previously, the overlay 44 may provide desired functionality for the wearer (e.g., heating or cooling effects) while also allowing the wearer to incorporate fashion or promote various interests.

Figure 9:
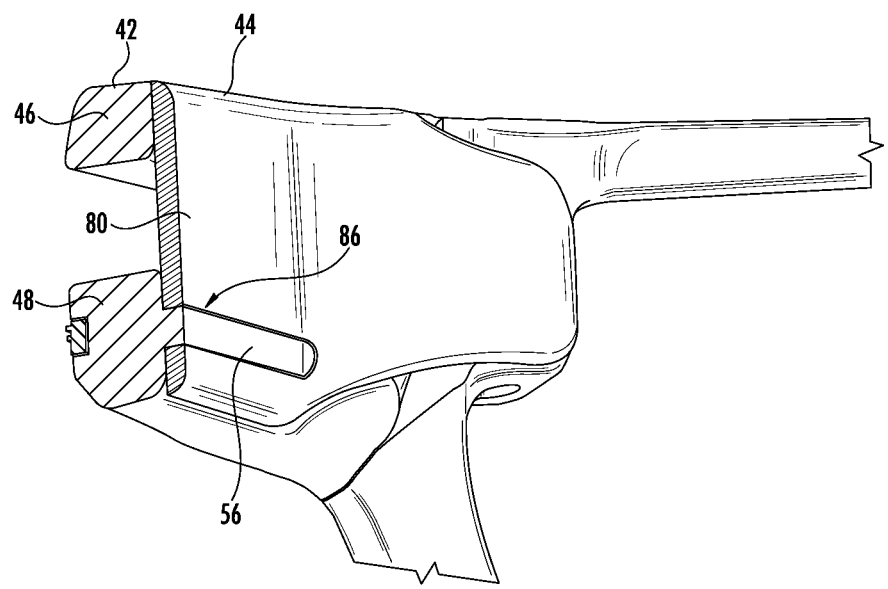
FIG. 9 is a cross-sectional view of an alternative embodiment of the temple overlay wherein the overlay panel is non-removeably coupled to the temple spine.

In each of the above-described embodiments shown in FIGS. 1-8, the temple overlay 44 is releasable relative to the temple spine 42. This provides certain advantages for the overlay, including the ability to remove and wash the overlay 44 separate from the frame 12, interchangeability of the overlay 44, and use of the eyeglasses 10 without the overlay. However, in at least one alternative embodiment, as shown in FIG. 9, the overlay 44 is permanently affixed to the temple member. In such embodiment, the lips 70 of the overlay may not be used, and the panel 80 may be fused or otherwise directly attached to the upper column 46 and lower column 48 of the spine 42. For example, as shown in FIG. 9, the overlay 44 may include only a panel 80 that extends between the upper column 46 and the lower column 48 of the spine 42. The panel 80, which may be comprised of a textile or any of various other materials as described above, is fused, co-molded, otherwise attached directly to a medial surface of the spine 42. Additional features may be used to assist in securing the overlay 44 on the spine 42, including the interlocking tab 56 and recess 86 arrangement described previously. However, in this embodiment, the overlay 44 is non-removeable from the spine 42.

The foregoing detailed description of one or more exemplary embodiments of the eyeglass frames with a temple overlay has been presented herein by way of example only and not limitation. It will be recognized that there are advantages to certain individual features and functions described herein that may be obtained without incorporating other features and functions described herein. Moreover, it will be recognized that various alternatives, modifications, variations, or improvements of the above-disclosed exemplary embodiments and other features and functions, or alternatives thereof, may be desirably combined into many other different embodiments, systems or applications. Presently unforeseen or unanticipated alternatives, modifications, variations, or improvements therein may be subsequently made by those skilled in the art which are also intended to be encompassed by the appended claims. Therefore, the spirit and scope of any appended claims should not be limited to the description of the exemplary embodiments contained herein.

What is claimed is:

1. Eyeglass frames comprising:
   a face member including a rim configured to retain a lens;
   at least one temple frame member connected to the face member, the temple frame member including an upper perimeter portion and a lower perimeter portion with a slot formed between the upper perimeter portion and the lower perimeter portion, temple frame member further including a greater girth segment and a lesser girth segment; and
   a temple overlay releasably coupled the temple frame member, the temple overlay comprising an upper lip and a lower lip, the upper lip configured to wrap around the upper perimeter portion of the temple frame member and the lower lip configured to wrap around the lower perimeter portion of the temple frame member, the upper lip and the lower lip of the temple overlay configured to wrap around the lesser girth segment of the temple frame member but not configured to wrap around the greater girth segment of the temple frame member, the temple overlay further comprising a panel extending between the upper lip and the lower lip such that the panel is exposed in the slot of the temple frame member when the temple overlay is coupled to the temple frame member, wherein the upper lip and the lower lip are sufficiently resilient such that the temple overlay may be repeatedly removed and repositioned on the temple frame member.

2. The eyeglass frames of claim 1 wherein the upper lip and the lower lip are comprised of a first material and the panel is comprised of a second material, the first material having a greater stiffness than the second material.

3. The eyeglass frames of claim 2 wherein the first material is an elastomer and the second material is a textile.

4. The eyeglass frames of claim 3 wherein the textile is a compression fabric configured to wick moisture.

5. The eyeglass frames of claim 1 wherein the slot is positioned between a plurality of angled support members extending between the upper perimeter portion and the lower perimeter portion.

6. The eyeglass frames of claim 5 wherein the angled support members are ribs, the upper perimeter portion is an upper column, and the lower perimeter portion is a lower column.

7. The eyeglass frames of claim 5 wherein the temple frame member defines an axis and the plurality of angled support members are angled between thirty and eighty degrees from the axis.

8. The eyeglass frames of claim 1 wherein the greater girth segment is provided on the lower perimeter portion of the temple and the lesser girth segment extends for a greater length than the greater girth segment on the lower perimeter portion of the temple.

9. The eyeglass frames of claim 1 wherein the lips of the temple overlay form a substantially flush surface with the greater girth segment of the temple frame member.

10. The eyeglass frames of claim 1 wherein the panel is comprised of a same material as the upper lips and the lower lips.

11. The eyeglass frames of claim 1 wherein the panel includes an aesthetic feature including a logo or geographic indicia.

12. A temple arrangement for eyeglasses, the temple arrangement comprising:
   a temple spine including an upper column, a lower column, a slot provided between the upper column and the lower column, and a plurality of angled support members extending between the upper column and the lower column, each of the plurality of angled support members including a forward edge and a rearward edge, the forward edge positioned closer to a lateral side of the temple spine than the rearward edge and configured to direct air inwardly toward a medial side of the temple spine when the temple arrangement is moved in a forward direction, the temple spine comprised of a first material; and
   a temple overlay releasably positioned on the temple spine, the temple overlay including an upper perimeter member configured to engage the upper column of the temple spine and a lower perimeter member configured to engage the lower column of temple the spine, the temple overlay further comprising a panel extending between the upper perimeter member and the lower perimeter member, the upper perimeter member and the lower perimeter member comprised of a second material, and the panel comprised of a third material, wherein the first material has a greater hardness than the second material, and the second material has a greater hardness than the third material.

13. The temple arrangement of claim 12 wherein the upper perimeter member is provided by upper lips configured to wrap around the upper column, and the lower perimeter member is provided by lower lips configured to wrap around the lower column.

14. The temple arrangement of claim 13 wherein the upper perimeter member and the lower perimeter member comprise an elastomer and the panel comprises a textile.

15. The temple arrangement of claim 14 wherein the elastomer is fused to the textile.

16. The temple arrangement of claim 12 wherein the temple overlay is a first overlay, the temple arrangement further comprising a second overlay configured to be releasably positioned on the temple spine when the first overlay is released from the temple spine, wherein a first panel on the first overlay is comprised of a different material than a second panel on the second overlay.

17. The temple arrangement of claim 12 wherein the temple spine defines an axis and the plurality of angled support members are angled between thirty and eighty degrees from the axis.

18. Eyeglass frames comprising:
a face member including a rim configured to retain a lens;
at least one temple frame member connected to the face member, the temple frame member including an upper perimeter portion and a lower perimeter portion with a first angled support member and a second angled support member separated by a slot extending between the upper perimeter portion and the lower perimeter portion, the angled support members including a forward edge positioned closer to a lateral side of the temple frame member than a rearward edge and configured to direct air inwardly toward a medial side of the temple frame member when the eyeglass frames are moved in a forward direction; and
a textile panel extending between the upper perimeter portion and the lower perimeter portion of the temple frame member such that the panel is exposed on the temple frame member.

19. The eyeglass frames of claim 18 wherein the textile panel is releasably retained on the temple frame member.

20. The eyeglass frames of claim 18 wherein the at least one temple frame member defines an axis and the first angled support member and the second angled support member are angled between thirty and eighty degrees from the axis.

* * * * *